(12) United States Patent
Baratti et al.

(10) Patent No.: US 7,895,124 B2
(45) Date of Patent: Feb. 22, 2011

(54) METHOD FOR PROTECTING SENSITIVE DATA DURING EXECUTION

(75) Inventors: Paolo Baratti, Rome (IT); Alice Guidotti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 950 days.

(21) Appl. No.: 11/065,657

(22) Filed: Feb. 24, 2005

(65) Prior Publication Data

US 2006/0143131 A1 Jun. 29, 2006

(30) Foreign Application Priority Data

Dec. 23, 2004 (EP) .................................. 04106935

(51) Int. Cl.
*G06F 21/00* (2006.01)
(52) U.S. Cl. .......................................... 705/57; 705/51
(58) Field of Classification Search .................. 713/1–2
See application file for complete search history.

(56) References Cited

U.S. PATENT DOCUMENTS

| | | | | |
|---|---|---|---|---|
| 4,791,565 | A * | 12/1988 | Dunham et al. | 726/31 |
| 5,640,562 | A * | 6/1997 | Wold et al. | 713/2 |
| 6,658,489 | B1 * | 12/2003 | Asselin | 719/327 |
| 7,356,679 | B1 * | 4/2008 | Le et al. | 713/1 |
| 2001/0034711 | A1 * | 10/2001 | Tashenberg | 705/52 |
| 2001/0044904 | A1 * | 11/2001 | Berg et al. | 713/201 |

(Continued)

OTHER PUBLICATIONS

White, Ron, "How Computers Work", Millennium Ed., Que Corporation, Indianapolis, IN, 1999.*
Derfler et al., "How Networks Work", Millennium Ed., Que Corporation, Indianapolis, IN, 2000.*
Gralla, Preston "How the Internet Works", Sixth Ed., Que Corporation, Indianapolis, IN, 2002.*
Muller, Nathan J., "Desktop Encyclopedia of the Internet", Artech House, Inc., Norwood, MA, 1999.*

*Primary Examiner*—Andrew J. Fischer
*Assistant Examiner*—C. Aaron McIntyre
(74) *Attorney, Agent, or Firm*—Garg Law Firm, PLLC; Rakesh Garg; Jeffrey S. LaBaw

(57) ABSTRACT

A method for protecting sensitive data during execution time. The sensitive data are normally stored on permanent storage devices (e.g. a hard disk). The method, according to the present invention is based on the creation at system boot of a runtime process and a corresponding runtime memory space. The sensitive data are then moved to the runtime memory space and the copy on the storage device is deleted or made unusable by users. At shutdown time the sensitive data are copied back to the storage device according to the uptodate version on the runtime memory. In particular the present invention is applied to a license management system which allows nodelocked licenses on client system even if the client is disconnected from the network. License information are considered sensitive data which should be protected during execution. A device driver is created at system boot time and a kernel cache memory is allocated to the driver. Sensitive data are then transferred to the kernel cache memory and deleted (or made non-accessible) on the permanent storage. Queries to the license information are made by means of driver I/O control codes. Sensitive data are then saved back to the permanent storage at shutdown time.

24 Claims, 4 Drawing Sheets

U.S. PATENT DOCUMENTS

2002/0188763 A1* 12/2002 Griffin .................... 709/310
2003/0037237 A1*  2/2003 Abgrall et al. ............. 713/166
2003/0108164 A1*  6/2003 Laurin et al. ............ 379/88.01
2004/0015962 A1*  1/2004 Carbone et al. ............ 717/178
2004/0039924 A1*  2/2004 Baldwin et al. ............ 713/189
2005/0005101 A1*  1/2005 Yenduri .................... 713/164

* cited by examiner

METHOD FOR PROTECTING SENSITIVE DATA DURING EXECUTION

TECHNICAL FIELD

The present invention relates to the data processing field. More specifically, the present invention relates to a method of protecting sensitive data from unauthorised use. The invention further relates to a computer program for performing the method, and to a product embodying the program. Moreover, the invention also relates to a corresponding system.

BACKGROUND ART

Software products (such as computer programs) can be perfectly reproduced in an infinite number of copies. This is a major concern for publishers of the products wishing to protect their intellectual property rights; indeed, the publishers typically receive a royalty for a licensed use of each product, so that any unaccounted use or distribution of the product results in unpaid royalties. The problem has been exacerbated in the last years by the widespread diffusion of the Internet, which further facilitates the uncontrolled distribution of this kind of products.

The most straightforward way of avoiding unaccounted usage of the products is that of preventing unauthorized copying and transmission. For example, some products embed control code that limits the number of copies that can be made or disables operation of the products after a predetermined period of time has lapsed. Another technique consists of requiring possession of a software or hardware key for running the products. A different solution consists of modifying each product to include a call to a licensing management system. Every time the product is started, a corresponding request is transferred to the licensing management system. The licensing management system verifies whether the usage of the product is authorized. If the result of the verification is positive, the product can continue its execution; otherwise, the product is forced to stop.

Once the execution of a product has been detected, the system can just meter the usage and monitor the execution or can allow or prevent the execution according to available licensing conditions. In the first case it is a pure metering system, while in the latter it is a controlling system.

An example of a state of the art license management system available on the market, is the License Use Management product of International Business Machines Corp.

The fact that a license management system is monitoring the use of a given software program should be as transparent as possible to the users of that software program whereas it should be evident and beneficial to the administrator of licenses for that and other software programs. This consideration places a strong requirement on the license management system in terms of reliability and performance. The ideal license management system should be one which never causes software program failures because of its outage nor becomes a bottleneck for the software programs that it monitors.

In a typical licensing system, all the terms and conditions of the products' license agreements are defined in encrypted license certificates. These certificates may be managed by a license server, in case of licenses shared among multiple clients on a network, or by a local agent in case of licenses for stand-alone applications locked to a specific node. In any case, the information contained in the certificate is permanent and must be kept on disk at least until the date of expiration indicated in the certificate itself. This introduces typical security and data integrity issues that can be addressed exploiting well-known encryption and cryptographic techniques. Another risk is the duplication of the license information by copying the license certificate on another system. For this reason the license certificate often also brings the indication of the unique system where it is valid and/or it can be installed: typically a secure identifier of the system for which it was explicitly generated, like a serial number derived from some hardware source.

However, when two or more databases of certificates must be kept in synch, because licensing information need to be spread over two or more systems, other potential security breaches must be taken into account.

Consider a scenario where license certificates are stored on a license server to which the network clients can connect. The license certificates can be shared among multiple network products according to their actual usage, for example using concurrency criteria. The licensing system can also give some users the capability to reserve licenses in an exclusive manner for a certain period of time, so that these users can disconnect from the network and keep running the licensed products on portable devices. In this scenario, information about the granted reservation and a portion of the original license agreement data must be stored on the client workstation, for example in the form of a new license certificate. The license server itself must keep information about all the outstanding reservations, so that a license already reserved cannot be granted to another user for the whole period of reservation. The licensing system can also give the possibility to such users to interrupt the reservation at any time, informing the license server that the license is available again for other users. This operation could be done as soon as the client restores its connection to the network.

If the end user discovers where the local copy of the certificate is stored on his disk, he could make a copy of it before returning it to the license server. In this way he could make an unauthorised use of the license. Simply, he could give the license back to the server, so that it could be reserved by another user, and keep working with his license just restoring the saved copy. There would be real license usage duplication, the main problem that a licensing system aims to avoid. By iterating this process, a malicious customer could make several reservations out of a single license that was intended for a single usage only.

Storing information on a file (or database) is not enough secure, even if this file is hidden, encrypted and valid only on a single system. Information persistency is however fundamental.

In a more general scope, the same problem occurs each time sensitive information must be protected from unauthorised use or malicious exploitation. As an example, there are cases where maintaining e.g. confidential information on disk when the system is up and running is insecure, mainly because files on hard drives can be more easily accessed by intruders from the Internet. Examples of confidential data are all personal information, such as names, addresses, social security numbers, credit card numbers and health information. Another example is the file of the passwords, which is usually kept by the users on a normal file on the hard disk. Unauthorised disclosure may be caused by a system weakness or by a human error (an employee might by mistake move confidential data to a folder that is not secure). Anything that is stored into a database can potentially be compromised intentionally or unintentionally. Even if the information is encrypted, data integrity is at risk: for instance, data could be deleted without needing to interpret their contents.

Known solutions to keep sensitive information permanent on a system are always based on files written on disk: e.g. hidden flat files, Windows Registry entries or encrypted databases. No matter what solution is chosen, it's always rather easy for a medium skilled user to discover where the information is stored and to save a copy of it for a later reuse. Normal access control techniques do not apply here because the Windows user may actually be the administrator of the system, with the highest permissions available. Cryptography does not provide a solution, because the simple act of copying a file or database as a whole and to restore it in another moment, without any need to interpret its content, is what we need to prevent.

It is an object of the present invention to provide a method and a system which alleviates the above drawbacks.

SUMMARY OF THE INVENTION

According to the present invention we provide a method of protecting, during execution, sensitive data stored on a permanent storage on a data processing system, including the steps of: allocating at system boot a dedicated runtime memory space; copying the sensitive data to the runtime memory space; preventing any access to the sensitive data on the permanent storage; responsive to a system shut down event, saving the sensitive data from the runtime memory space to the permanent storage.

A further aspect of the present invention provides a computer program for performing the above-described method.

A still further aspect of the invention provides a program product embodying this program.

In this way, the present invention provides a method and system for keeping secure information on a system, so that persistency is maintained, but strongly increasing the level of hiding and protection, making data virtually not accessible, not modifiable and, above all, not duplicable. In a particular embodiment of the present invention, the method and system prevent the possibility to save license certificates and restore them when needed, in order to illegally exceed the limits of the license agreement.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT(S)

Figure 1:
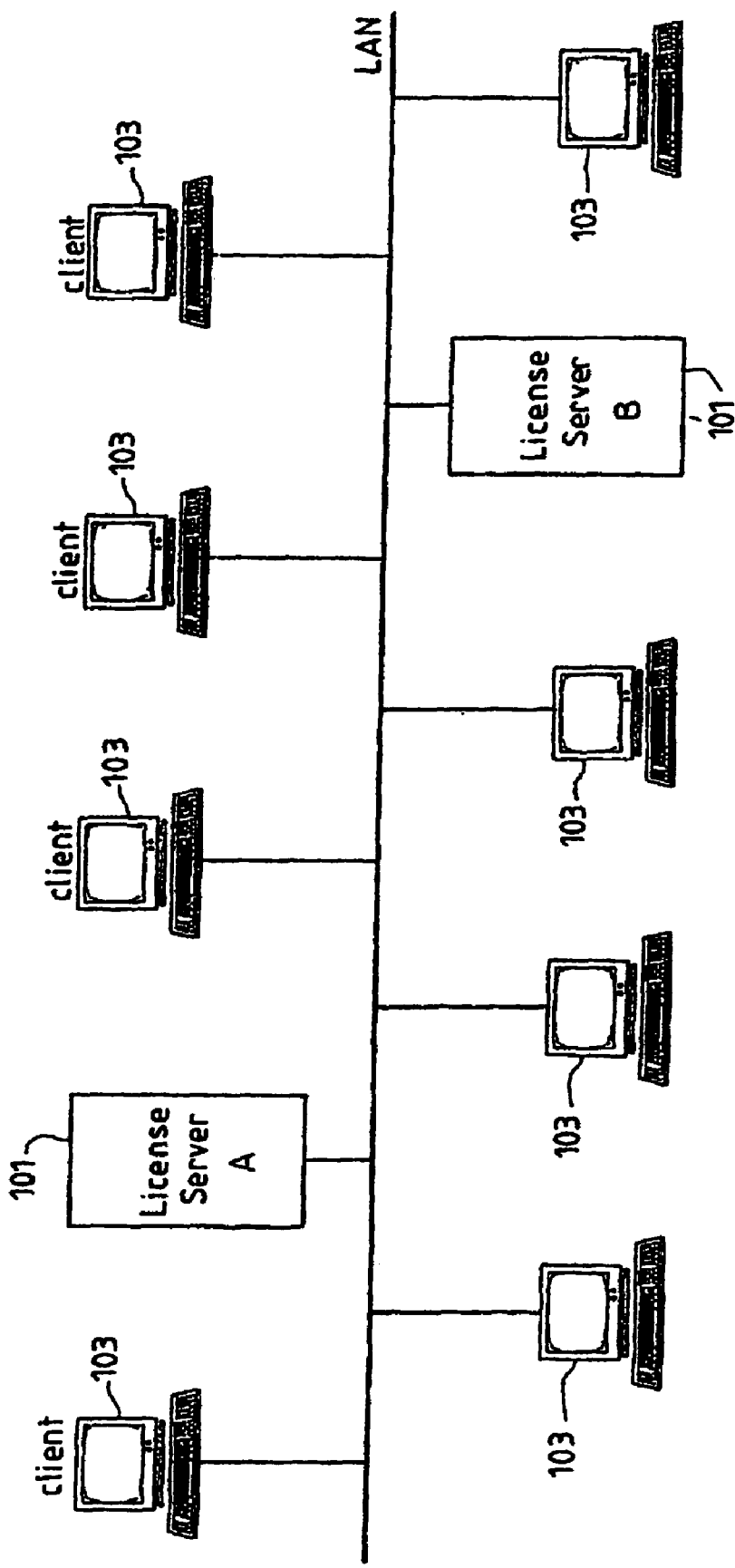
FIG. 1 is a schematic block diagram of a data processing system in which the method of the invention is applicable.

In a typical network of interconnected computers with a license management system, as illustrated in FIG. 1, one or more of the nodes 101 act as license servers, while a plurality of nodes 103 act as clients of the license servers. The service provided by a license server 101 to its client 103 is that of granting or denying permission to run a given software program, according to the availability of a license record in the license server data base, and to the terms and conditions encoded in the license record itself. The license server usually creates and stores license records in the license data base upon processing license certificate files, which are provided by the software vendor and complement the software program to which they are related. This license data base must be locked in some way to the specific instance of the license server (hardware+software) to prevent malicious users from copying the license data base to another license server machine and multiplying the number of licenses for all the software products contained in the license data base. License certificate files may contain some encryption or checksum information that allow the license server to verify their authenticity and integrity.

A license management product is generally composed by a licensing system (license server and administrator tools), which allows users of license-enabled software to manage their licensing environment and a set of e.g. APIs, which allows vendors to implement license management in an application, by means of embedding API calls in their product.

A license, in the context of license management, is the permission to use an instance of a licensed software product or service, according to the basis on which the vendor charges for the product or service. Vendors deliver licenses to customers in the form of an encrypted license password, which contains information about the terms of usage of the software product (such as license type, license expiration date, etc. . . . ).

Vendors can supply licenses in two forms: nodelocked licenses or network licenses. A nodelocked license is a license for a specified workstation (such as the nodes 103). It is stored on the specified workstation, and the license-enabled product will run only on that workstation. If a nodelock license is provided to one of the workstations at nodes 103, the licensed application can run even if the node is disconnected from the network. Network licenses, instead, rather than being restricted to a single workstation, are stored on a network license server (e.g. 101) and shared among multiple network license clients. In this case, clients need to be connected to the network (and to the license server) to run the licensed application.

A typical use of nodelocked licenses implies that the password for the licensed product is stored in a so-called nodelock file. When the application is started, it checks the nodelock file to ensure there is a valid license.

A typical use of network licenses is that of concurrent licenses, which are licenses that can be temporarily granted to run the licensed application on a client. When the product is running, that license is not available to other users of the product. When the product stops running, the license is returned to the server, where it becomes available to other users. Concurrent licenses allow as many users to run a licensed application simultaneously as there are valid licenses for the product available from the network license servers in the licensing environment.

A license management system allows a user to install a copy of a software program on N nodes of a network, but acquire only a limited number n licenses, where at any time, only the maximum number n copies of that program can be simultaneously run on the network. When all the available licenses are allocated, additional users requesting the use of that software must wait for a license to become available. This kind of license management system has a number of advantages for both the software vendor and the user, because it allows the user to purchase all and only the licenses really needed and, on the other hand, allows the vendor to fight software piracy.

Consider an extension of concurrent licenses, where licenses can be used as normal concurrent licenses but have also an additional functionality: they allow users to reserve a license for a certain number of hours or days and to use it on a portable computer disconnected from the network. When the license has been reserved for use, a (nodelocked) copy is installed on a portable computer connected to the network. When the nodelocked license has been installed on the portable computer, the portable computer can be disconnected from the network.

Figure 2A:
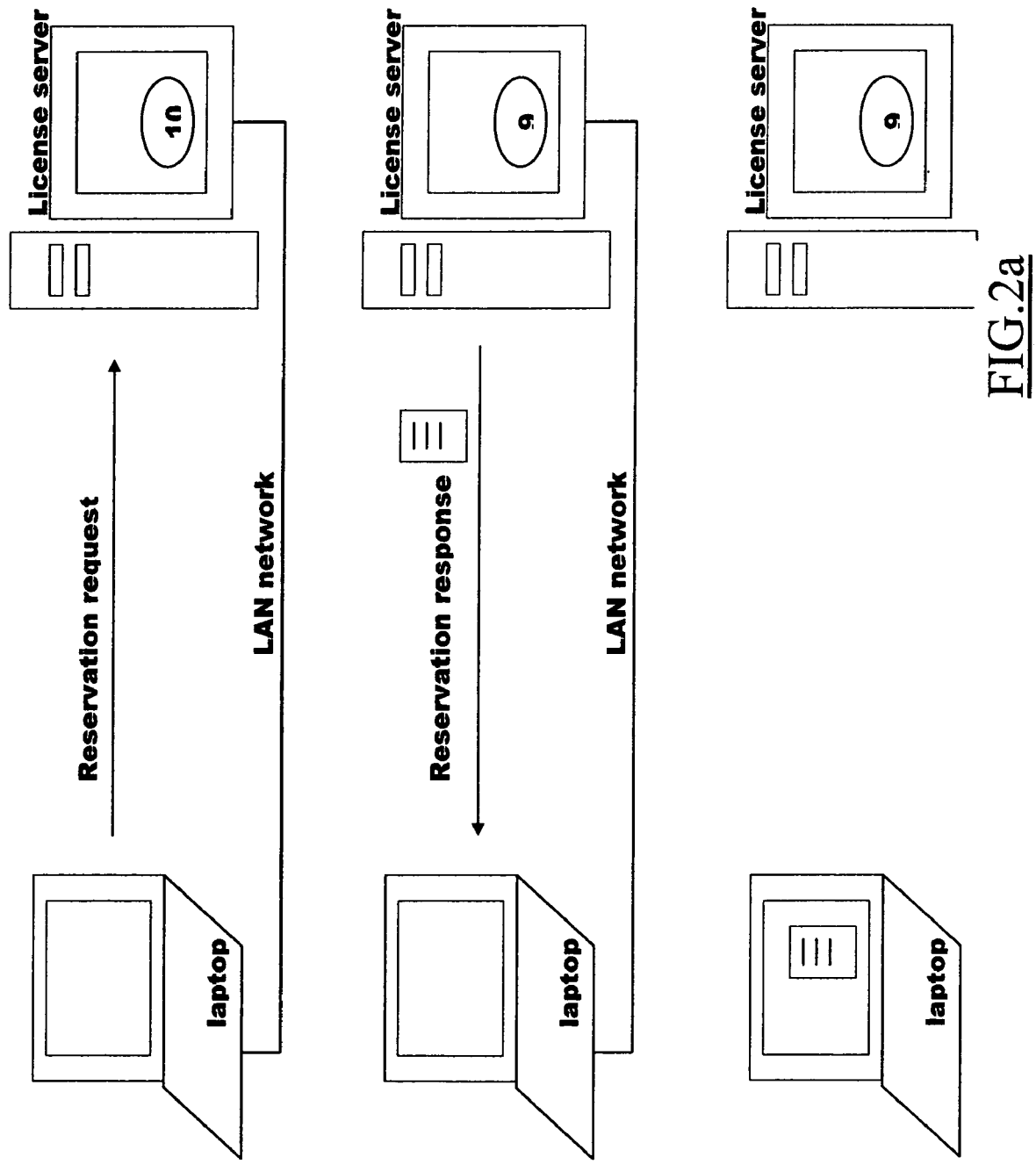
FIGS. 2a-2b show a licensing arrangement with portable computers which can be disconnected from the server.
Figure 2B:
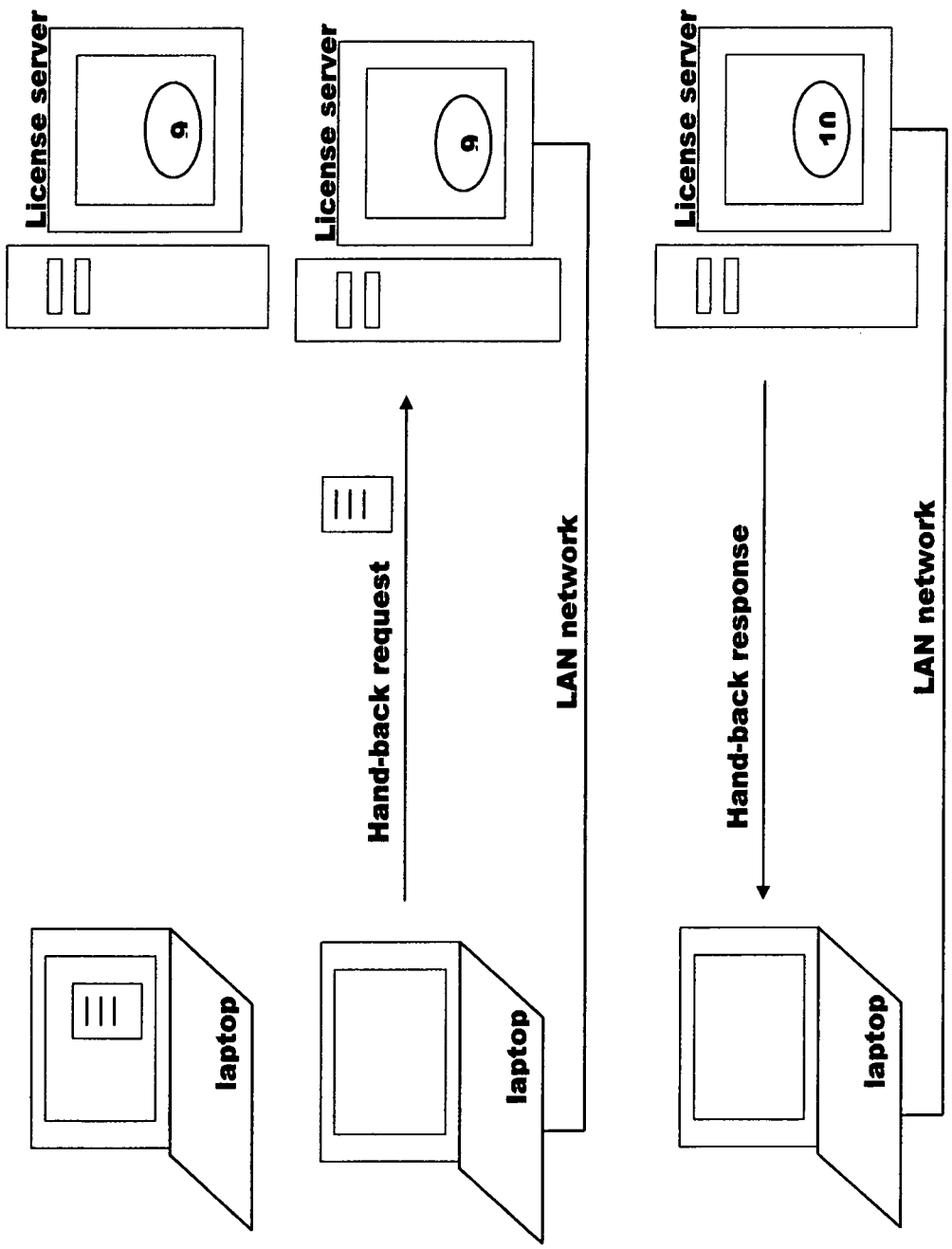

FIGS. 2a and 2b show how this licensing scenario works. FIG. 2a shows the reservation step. The end-user requests the license for his laptop to the license server. The license server has e.g. a pool of 10 concurrent licenses shared among multiple clients. The license server reserves the first available license from his pool of concurrent licenses and sends it back to the end-user by means of a nodelocked license, which is installed on the portable computer. The portable computer is then disconnected from the network, and can run the licensed application. There are now 9 remaining licenses in the pool of concurrent licenses of the license server. FIG. 2b shows the hand-back step. The laptop is reconnected to the network and the license is returned to the license server. The license is cancelled from the laptop and the pool of available licenses on the license server shows again 10 concurrent licenses.

A system like this could give a malicious user the possibility of an unauthorised use of the licenses. E.g. the end-user, right after the reservation step, could save a local copy of the license and return the license to the license server. The license is back again to the pool of licenses of the server (available either for concurrent usage or for a new reservation). The end-user then disconnects from the network, restores his saved copy and keeps running the licensed application.

The method according to the present invention prevents the unauthorised use described above.

According to a preferred embodiment of the present invention licensing data are copied from license file on disk into a subsystem process (e.g. A Windows kernel driver) explicitly developed for this purpose. The subsystem process simulates a device driver for a virtual, hidden device but its only role is to maintain critical information into its internal memory. It is started automatically by the operating system at system boot time and is defined as not stoppable. If not installed, or stopped, or not working properly any type of licensing activity is inhibited, like the possibility to run license-enabled applications. Licensing data could then be deleted from the license file.

Even if the end user is smart enough to discover the subsystem process and to understand its purpose he wouldn't be able to access its memory cache, that can only be read and written by means of a proper sequence of device I/O control calls. Basically, even if he could take a system dump, discover where the hidden data are located in the kernel memory, and decrypt them, there would be in practice no way for him to save, alter or restore those data.

The driver cache is specifically modeled to contain licensing data of a certain type. However, modeling it in a general way in order to store any type of data streams is a straightforward extension that would allow this technique to be reused for hiding and protecting any other type of sensitive data.

According to a preferred embodiment of the present invention, a new device driver is defined to the operating system (e.g. Windows) as a kernel driver to be started during the operating system initialization, immediately after the lowest level drivers needed by the system to load itself. During its start-up the driver creates a device object of unknown type, allocates a device extension memory cache for this object, populates it with the content of the license file, if any, and register itself as a driver to be called by the operating system during shutdown. Also, it exports a set of input/output entry points that will allow external processes to dispatch queries, write and delete operations to/from the driver cache, exactly as a file system driver provides I/O access methods to/from a file. Of course these methods, their interfaces and the specific device I/O control codes are only exported to programs and processes of the licensing system itself, and they can be hardly discovered by other programmers.

Data are then saved on the disk at system shutdown.

In order to maintain persistency across system reboots, it would be also possible to save data on a disk in a hidden and encrypted file, not only at system shutdown but also periodically, to prevent inconsistencies in case of unexpected system crash. Of course this choice would make the whole system a little less secure, but persintency of data would be better preserved.

Data on the file are only read in a very early stage of the boot sequence of the system and then no longer accessed during driver execution. Only information in the driver memory is exploited by licensing applications that need to. Also, administrative operations implying an update of the sensitive data directly take place on the kernel driver's cache memory.

Even in the case of a file saved on disk from time to time, as a matter of fact the kernel memory would be the only actual repository of the sensitive data and any attempt to modify the hidden file, once discovered, would be useless because it will soon be rewritten with the original data from the driver. Every time an update is reported to the hidden file its last access and modification times are reset to the original time stamps. In this way, it would be more difficult to understand what is the purpose of this file with respect to the sensitive data contained in the driver cache.

The driver code executed during shutdown also resets drivers' properties in case an attempt was made to alter them, like its start-up order at boot time, or its enabled, not stoppable state.

Let's suppose that a malicious user makes a copy of the license on his laptop. At the hand-back step, the licensed application notifies the driver of the hand-back event, so that the license is marked as non-valid in the driver's cache. Even if the end-user restores his saved copy of the license, this one has been marked as invalid and therefore non-usable. When the licensed application is started, it will send a verification request to the kernel driver to check if the license is still valid. The driver will notify the licensed application that the license is not valid anymore and the license application will perform an appropriate action (such as stopping its execution).

At the reservation step, the licensed application sends to the driver all needed information about the license (license password, reservation period, license validity, etc. . . . ). The driver's cache is updated with the new license. At the hand-back step, the license is marked as not valid in the driver's cache. At the check-license step, the licensed application requests the license status from the driver. If the license either is not found or is found not valid, the driver notifies the application that the license cannot be used. Otherwise, the driver notifies the application that the license has been found and it is valid and the application can keep working properly.

Figure 3:
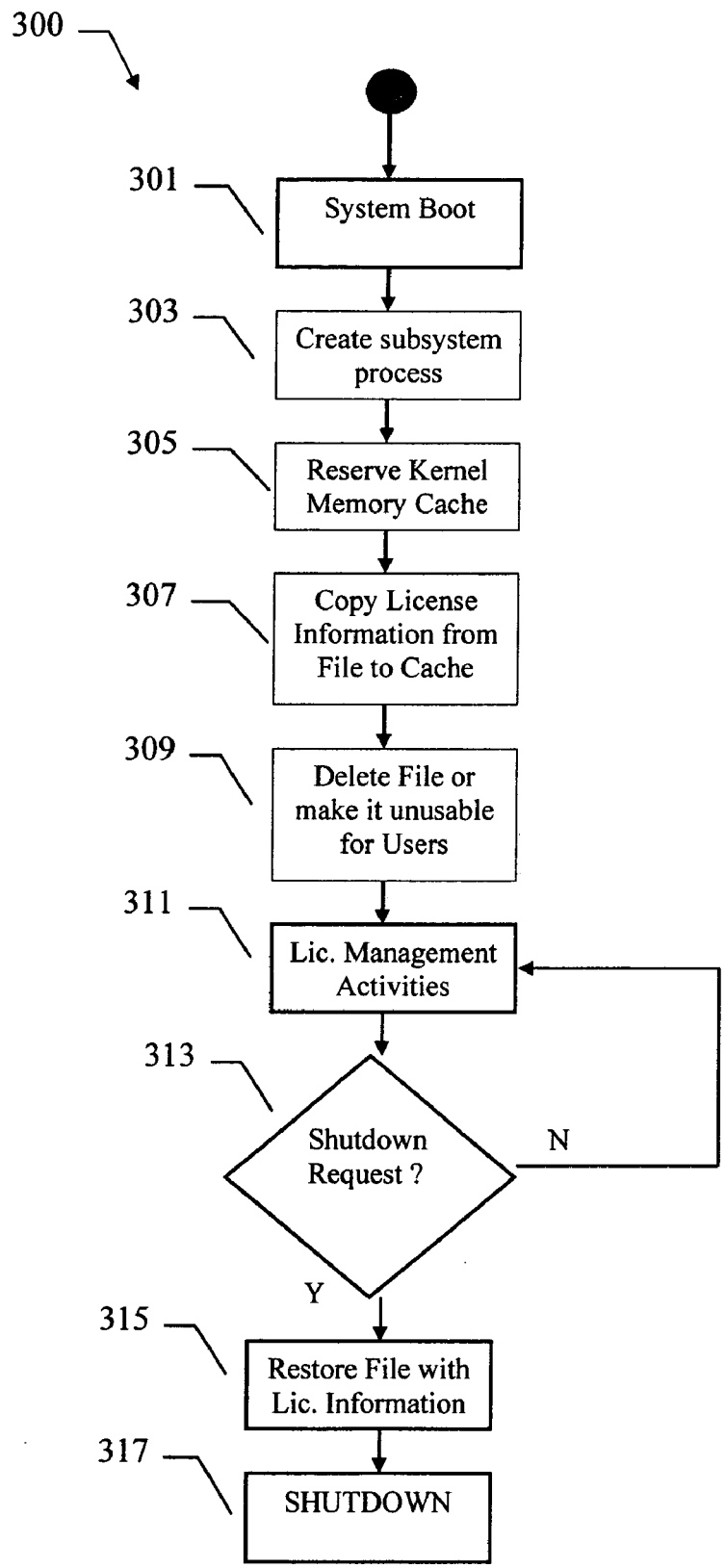
FIG. 3 Shows a diagram describing the flow of activities relating to an illustrative implementation of the method.

Considering now FIG. 3, the logic flow of a metering process according to an embodiment of the invention is represented with a method 300. The method begins at the block 301 where the system is rebooted. Continuing to block 303, a subsystem runtime process (e.g. a device driver process) is launched and a memory location in the kernel cache is reserved for this process (step 305). The content of a license file with all the information on available licenses, is then copied into the subsystem cache (step 307). The file on the disk is either deleted or made unusable by the users (step 309). Then the license management system performs the usual activities (step 311), but when information on the license is needed it queries the subsystem process instead of the license file. When a shutdown event is detected (313), the license file is restored (315) using the uptodate information saved in the subsystem cache. Then the system can shutdown.

Similar considerations apply if the programs and data are structured in a different manner, if other modules or functions are provided, or if the information is stored in equivalent memory structures. The system could even just meter the usage and keeping track of the corresponding information without performing any control activity, based on available licenses.

Similar considerations apply if the method includes equivalent or additional steps.

Alternatively, for example different methods of storing the sensitive information can be used, depending also on the operating system on which the system is installed.

Although the invention has been described above with a certain degree of particularity with reference to preferred embodiment(s) thereof, it should be understood that various changes in the form and details as well as other embodiments are possible. Particularly, it is expressly intended that all combinations of those elements and/or method steps that substantially perform the same function in the same way to achieve the same results are within the scope of the invention.

In any case, the method of the invention can be used to meter any kind of software products (such as video on demand, video games, multimedia works, and the like); moreover, the launch of the products can be detected in another way (for example, periodically collecting a list of the executable modules that are running).

Also, it is very important to notice that the present invention can easily be applied to all situations where maintaining confidential information on disk when the system is up and running is considered insecure, mainly because files on hard drives can be more easily accessed by intruders from the Internet. Examples of confidential data are all personal information, such as names, addresses, social security numbers, credit card numbers and health information. Another example is the file of the passwords, which is usually kept by the users on a normal file on the hard disk. Unauthorized disclosure may be caused by a system weakness or by a human error (an employee that might by mistake move confidential data to a folder that is not secure). Anything that is stored into a database can potentially be compromised intentionally or unintentionally. Even if the information is encrypted, data integrity is at risk: for instance, data could be deleted without needing to interpret their contents.

Consider the example of the file of the passwords. At system boot, all passwords on the file could be uploaded to the cache of the kernel driver and deleted from the file. When a password is needed, an appropriate query is sent to the kernel driver (for instance, by means of a graphical user interface) and in response the password is displayed to the user.

In addition, the programs can be distributed on any other computer readable medium (such as one or more DVDs); alternatively, the programs are pre-loaded onto the harddisks, are transmitted to the computers, are broadcast, or more generally are provided in any other form directly loadable into the working memories of the computers.

Moreover, it will be apparent to those skilled in the art that the additional features providing further advantages are not essential for carrying out the invention, and may be omitted or replaced with different features.

In any case, the method according to the present invention is also suitable to be carried out with a hardware structure (for example, integrated in a chip of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims.

The invention claimed is:

1. A computer implemented method of preventing a use of content in a file in a permanent storage where the content in the file is subject to unauthorized manipulation, comprising:
   creating a device driver, the device driver being associated with a device object, and the device driver operating under an operating system;
   starting the device driver at a time of booting the operating system;
   defining the device driver as unstoppable in the operating system;
   allocating a memory cache for the device object, the memory cache being accessible to the device driver;
   copying the content in the file in the permanent storage, from the file to the memory cache to form content in the memory cache;
   referring a request to manipulate the content in the file to the device driver;
   manipulating, responsive to the request, the content in the memory cache, wherein the manipulating the content in the memory cache prevents the use of an unauthorized manipulation of the content in the file in the permanent storage; and
   overwriting the content in the file in the permanent storage with the content in the memory cache at a designated time.

2. The computer implemented method of claim 1, wherein the manipulating comprises revoking a validity of a content, the computer implemented method further comprising:
   marking the content in the memory cache as invalid, forming invalid content;
   writing the invalid content to the file in the permanent storage, wherein the writing occurs a plurality of times, and wherein the writing occurring the plurality of times causes an unauthorized update of the file with a valid content after a first writing to be overwritten by the invalid content at a next writing.

3. The computer implemented method of claim 1, wherein the manipulating comprises revoking a validity of a content, the computer implemented method further comprising:
   marking the content in the memory cache as invalid, forming invalid content;
   deleting the file in the permanent storage.

4. The computer implemented method of claim 1, wherein the designated time is the time of a shutdown of the operating system.

5. The computer implemented method of claim 1, further comprising:
   exporting from the device driver a set of input/output entry points such that a process external to the device driver communicates with the device driver using the set of input/output entry points as if the process is communicating with a file system;
   referring to the device driver, a request for the content in the file in the permanent storage by an application associated with the process; and serving, responsive to the request, the content in the memory cache.

6. The computer implemented method of claim 1, further comprising:
registering the device driver with the operating system as a device driver to be called when the operating system is shutting down; and
inhibiting a use of the file in the permanent storage responsive to one of (i) the device driver not being installed, (ii) the device driver being stopped at a time other than when the operating system is shutting down, and (iii) the device driver not working as designed.

7. The computer implemented method of claim 1, further comprising:
writing the content in the memory cache to a second file in the permanent storage, the second file being hidden and encrypted, and the writing the second file preserving the content in the memory cache in case of a system crash.

8. The computer implemented method of claim 1, wherein the content in the file in the permanent storage is a license to use an application on a data processing system.

9. The computer implemented method of claim 8, further comprising:
sending, at a time of starting the application, from the application to the device driver, a request to verify the license;
sending, at a time of checking the license, from the application to the device driver, a request for license status;
responding to the request for the license status, from the device driver to the application, based on the content in the memory cache;
sending, at a time of reserving the license, from the application to the device driver, information about a validity of the license;
updating the memory cache with the information;
marking, at a time of handing back the license, the information in the memory cache to invalidate the license.

10. The computer implemented method of claim 1, wherein the copying comprises reading the file, the reading occurring only during the time of booting the operating system.

11. A computer usable program product comprising a computer usable storage medium including computer usable code for preventing a use of content in a file in a permanent storage where the content in the file is subject to unauthorized manipulation, the computer usable code comprising:
computer usable code for creating a device driver, the device driver being associated with a device object, and the device driver operating under an operating system;
computer usable code for starting the device driver at a time of booting the operating system;
computer usable code for defining the device driver as unstoppable in the operating system;
computer usable code for allocating a memory cache for the device object, the memory cache being accessible to the device driver;
computer usable code for copying the content in the file in the permanent storage, from the file to the memory cache to form content in the memory cache;
computer usable code for referring a request to manipulate the content in the file to the device driver;
computer usable code for manipulating, responsive to the request, the content in the memory cache, wherein the manipulating the content in the memory cache prevents the use of an unauthorized manipulation of the content in the file in the permanent storage; and
computer usable code for overwriting the content in the file in the permanent storage with the content in the memory cache at a predetermined time.

12. The computer usable program product of claim 11, wherein the manipulating comprises revoking a validity of a content, the computer usable program product further comprising:
computer usable code for marking the content in the memory cache as invalid, forming invalid content;
computer usable code for writing the invalid content to the file in the permanent storage, wherein the writing occurs a plurality of times, and wherein the writing occurring the plurality of times causes an unauthorized update of the file with a valid content after a first writing to be overwritten by the invalid content at a next writing.

13. The computer usable program product of claim 11, wherein the manipulating comprises revoking a validity of a content, the computer usable program product further comprising:
computer usable code for marking the content in the memory cache as invalid, forming invalid content;
computer usable code for deleting the file in the permanent storage.

14. The computer usable program product of claim 11, wherein the designated predetermined time is the time of a shutdown of the operating system.

15. The computer usable program product of claim 11, further comprising:
computer usable code for exporting from the device driver a set of input/output entry points such that a process external to the device driver communicates with the device driver using the set of input/output entry points as if the process is communicating with a file system;
computer usable code for referring to the device driver, a request for the content in the file in the permanent storage by an application associated with the process; and
computer usable code for serving, responsive to the request, the content in the memory cache.

16. The computer usable program product of claim 11, further comprising:
computer usable code for registering the device driver with the operating system as a device driver to be called when the operating system is shutting down; and
computer usable code for inhibiting a use of the file in the permanent storage responsive to one of (i) the device driver not being installed, (ii) the device driver being stopped at a time other than when the operating system is shutting down, and (iii) the device driver not working as designed.

17. The computer usable program product of claim 11, further comprising:
computer usable code for writing the content in the memory cache to a second file in the permanent storage, the second file being hidden and encrypted, and the writing the second file preserving the content in the memory cache in case of a system crash.

18. The computer usable program product of claim 11, wherein the content in the file in the permanent storage is a license to use an application on a data processing system.

19. The computer usable program product of claim 18, further comprising:
computer usable code for sending, at a time of starting the application, from the application to the device driver, a request to verify the license;
computer usable code for sending, at a time of checking the license, from the application to the device driver, a request for license status;

computer usable code for responding to the request for the license status, from the device driver to the application, based on the content in the memory cache;

computer usable code for sending, at a time of reserving the license, from the application to the device driver, information about a validity of the license;

computer usable code for updating the memory cache with the information;

computer usable code for marking, at a time of handing back the license, the information in the memory cache to invalidate the license.

20. The computer usable program product of claim 11, wherein the computer usable code for copying comprises computer usable code for reading the file, the reading occurring only during the time of booting the operating system.

21. The computer usable program product of claim 11, wherein the device object is a virtual device, wherein defining the device driver as unstoppable is defining the device driver as not stoppable, wherein the memory cache is also called a "driver cache", wherein referring includes dispatching, wherein manipulating includes at least one of dispatching queries, reading, writing, copying, marking, updating, and checking, wherein the overwriting includes one of rewriting, resetting a parameter, and saving, wherein at the predetermined time is one of at system shutdown, periodically, and from time to time, wherein the file in the permanent storage is a file stored on the permanent storage, and wherein content in the memory cache is data stored in the memory cache, wherein the content in the file is one of license information, passwords, and other confidential information, and wherein preventing the use is making unusable.

22. The computer usable program product of claim 12, wherein revoking the validity includes marking as non-valid, the invalid content being the content in the memory cache marked as non-valid.

23. The computer usable program product of claim 17, wherein preserving the content in the memory cache is preventing inconsistencies while maintaining persistency of data.

24. A computer usable program product comprising a computer usable storage medium including computer usable code for preventing a use of content in a file in a permanent storage where the content in the file is subject to unauthorized manipulation, the computer usable code comprising:

computer usable code for creating a device driver, the device driver being associated with a virtual device, and the device driver operating under an operating system;

computer usable code for starting the device driver at a time of booting the operating system;

computer usable code for defining the device driver as not stoppable in the operating system;

computer usable code for allocating a memory cache for the virtual device, the memory cache being accessible to the device driver;

computer usable code for copying the content in the file in the permanent storage, from the file to the memory cache to form content in the memory cache;

computer usable code for dispatching a request to one of (i) query, (ii) write, (iii) delete, (iv) verify, and (v) check the content in the file to the device driver;

computer usable code for one of (i) querying, (ii) writing, (iii) deleting, (iv) verifying, and (v) checking, responsive to the request, the content in the memory cache, wherein the one of (i) querying, (ii) writing, (iii) deleting, (iv) verifying, and (v) checking the content in the memory cache makes the use of an unauthorized manipulation of the content in the file in the permanent storage non-usable; and computer usable code for one of (i) writing a deleted content in the file in the permanent storage with the content in the memory cache, (ii) rewriting the content in the file in the permanent storage with the content in the memory cache, and (iii) resetting a parameter of the file in the permanent storage, at a predetermined time.

* * * * *